US012685259B2

(12) United States Patent
Minnich et al.

(10) Patent No.: US 12,685,259 B2
(45) Date of Patent: Jul. 21, 2026

(54) GRAIN TANK SUMP FOR AGRICULTURAL VEHICLE

(71) Applicant: CNH Industrial America LLC, New Holland, PA (US)

(72) Inventors: Michael Minnich, Elizabethtown, PA (US); Denver Yoder, Manheim, PA (US); Ashutosh Tamrakar, Conshohocken, PA (US)

(73) Assignee: CNH Industrial America LLC, New Holland, PA (US)

( * ) Notice: Subject to any disclaimer, the term of this patent is extended or adjusted under 35 U.S.C. 154(b) by 343 days.

(21) Appl. No.: 18/389,354

(22) Filed: Nov. 14, 2023

(65) Prior Publication Data

US 2025/0151645 A1     May 15, 2025

(51) Int. Cl.
*A01D 41/12*        (2006.01)

(52) U.S. Cl.
CPC ................................ *A01D 41/1217* (2013.01)

(58) Field of Classification Search
CPC ...................................................... A01D 41/12
See application file for complete search history.

(56) References Cited

U.S. PATENT DOCUMENTS

| | | | | |
|---|---|---|---|---|
| 3,568,863 A | * | 3/1971 | Rohwedder | A01F 12/46 198/860.5 |
| 4,923,358 A | * | 5/1990 | Van Mill | B60P 1/42 414/520 |
| 5,615,989 A | | 4/1997 | Matousek et al. | |

| | | | | |
|---|---|---|---|---|
| 5,733,094 A | * | 3/1998 | Bergkamp | B60P 1/40 414/502 |
| 6,102,795 A | | 8/2000 | Behrens | |
| 6,358,143 B1 | | 3/2002 | Hurlburt | |
| 8,007,353 B1 | * | 8/2011 | Werning | A01F 12/46 460/13 |
| 9,961,835 B2 | * | 5/2018 | Lauwers | A01D 57/00 |
| 2004/0110547 A1 | | 6/2004 | Pope et al. | |
| 2008/0092504 A1 | | 4/2008 | Voss et al. | |
| 2015/0313080 A1 | | 11/2015 | Matousek et al. | |

FOREIGN PATENT DOCUMENTS

RU          2765580 C1      2/2022

OTHER PUBLICATIONS

The Extended European Search Report issued Mar. 31, 2025, by the European Patent Office in corresponding European Patent Application No. 24213033.4. (10 pages).

* cited by examiner

*Primary Examiner* — Joseph M Rocca
*Assistant Examiner* — Jose Antonio Martinez
(74) *Attorney, Agent, or Firm* — Buchanan Ingersoll & Rooney PC

(57)          ABSTRACT

A clean grain tank for an agricultural harvester includes a grain tank with a sump a vertical auger having an end that is positioned within the sump of the grain tank for removing clean grain from the sump, and at least one cross-auger arranged in a trough and configured to convey the grain into the sump. The sump is partially encompassed by walls, one of the walls including a cross-auger inlet opening facing the cross-auger and being configured to allow the grain to pass therethrough and into the sump. The cross-auger inlet opening includes a rounded segment and at least one straight segment, wherein the at least one straight segment follows a trajectory of a wall of the trough.

19 Claims, 11 Drawing Sheets

GRAIN TANK SUMP FOR AGRICULTURAL VEHICLE

FIELD OF THE INVENTION

The present invention relates to agricultural harvesters, such as combine harvesters, for example, and more particularly to grain unloading systems for combine harvesters.

BACKGROUND OF THE INVENTION

In a typical combine harvester, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. The grain tank is typically located in an upper portion of the combine and loaded via a conveyer that carries clean grain collected in the cleaning system to the grain tank for temporary storage. Other systems also exist that can utilize, for example, a loop conveyor system which eliminates the need for a conventional cross auger.

Conventional unload systems include grain tanks arranged such that grain conveyed from the cleaning system fills the tanks and is gravity-fed into one or more cross augers arranged at or adjacent to the bottom of the grain tank and extending into the inlet opening of the unloader conveyor or auger for conveying grain into the unloader. By virtue of gravity feed and by movement of the cross augers, grain may be distributed to one or more areas in the grain tank, such that another conveying system can unload the grain from the grain tank.

Grain tanks of combines commonly have an associated unloader conveyor operable for conveying grain from the grain tank to another location such as to a grain truck or wagon. An unloader conveyor typically includes an elongate, enclosed tubular housing (also referred to as either a grain tank sump or a sump) containing a helical auger and is oriented horizontally or at a small acute angle to horizontal. The unloader conveyor is typically pivotally supported in cantilever relation by a lower end of an upstanding or vertical lower unloader conveyor or auger section including an inlet opening disposed in or adjacent to the grain tank. The unloader conveyor is typically pivotable between a stored position extending along the combine, and a sidewardly extending unloading position. The unloader can be of any length, but will typically have a length sufficient to extend just beyond the end of a header of the combine.

The unloading system of the combine requires a significant amount of power to operate, with power requirements foreseeably increasing, especially in light of the demand for ever-increasing grain delivery rates by the combine. Modern combines have an increased unload rate, which requires additional power to move the grain during unload.

Described herein is a grain unloading system that achieves increased grain delivery rates while simultaneously reducing the amount of power required to operate the system.

SUMMARY OF THE INVENTION

A clean grain tank for an agricultural harvester includes a grain tank with a sump a vertical auger having an end that is positioned within the sump of the grain tank for removing clean grain from the sump, and at least one cross-auger arranged in a trough and configured to convey the grain into the sump. The sump is partially encompassed by walls, one of the walls including a cross-auger inlet opening facing the cross-auger and being configured to allow the grain to pass therethrough and into the sump. The cross-auger inlet opening includes a rounded segment and at least one straight segment, wherein the at least one straight segment follows a trajectory of a wall of the trough.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION OF THE INVENTION

The terms "grain," "straw," and "tailings" are used principally throughout this specification for convenience, but it is to be understood that these terms are not intended to be limiting. Thus, "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right," when used in connection with the agricultural harvester (e.g., combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1:
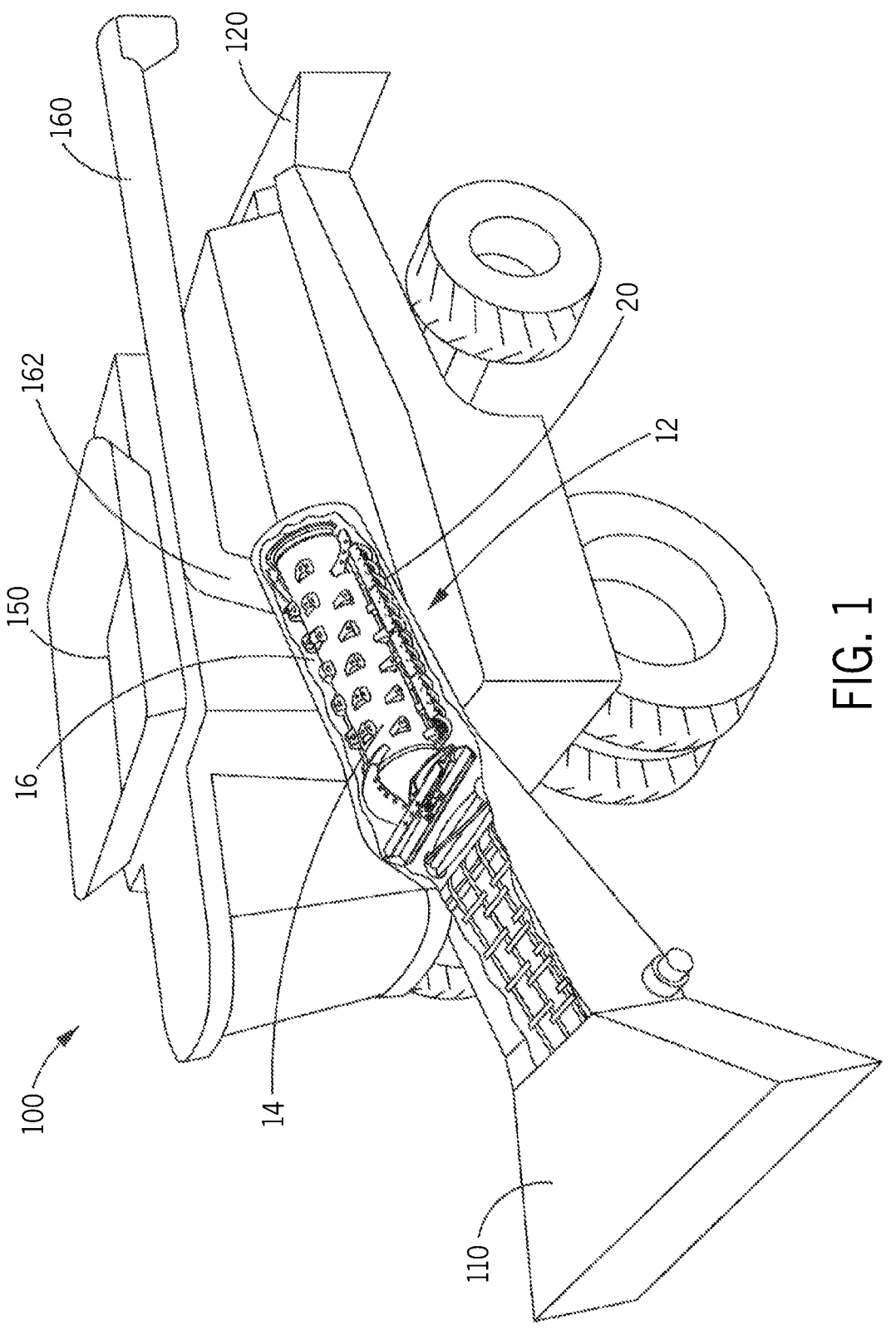
FIG. 1 is a perspective view of an exemplary combine according to embodiments described herein.
Figure 2:
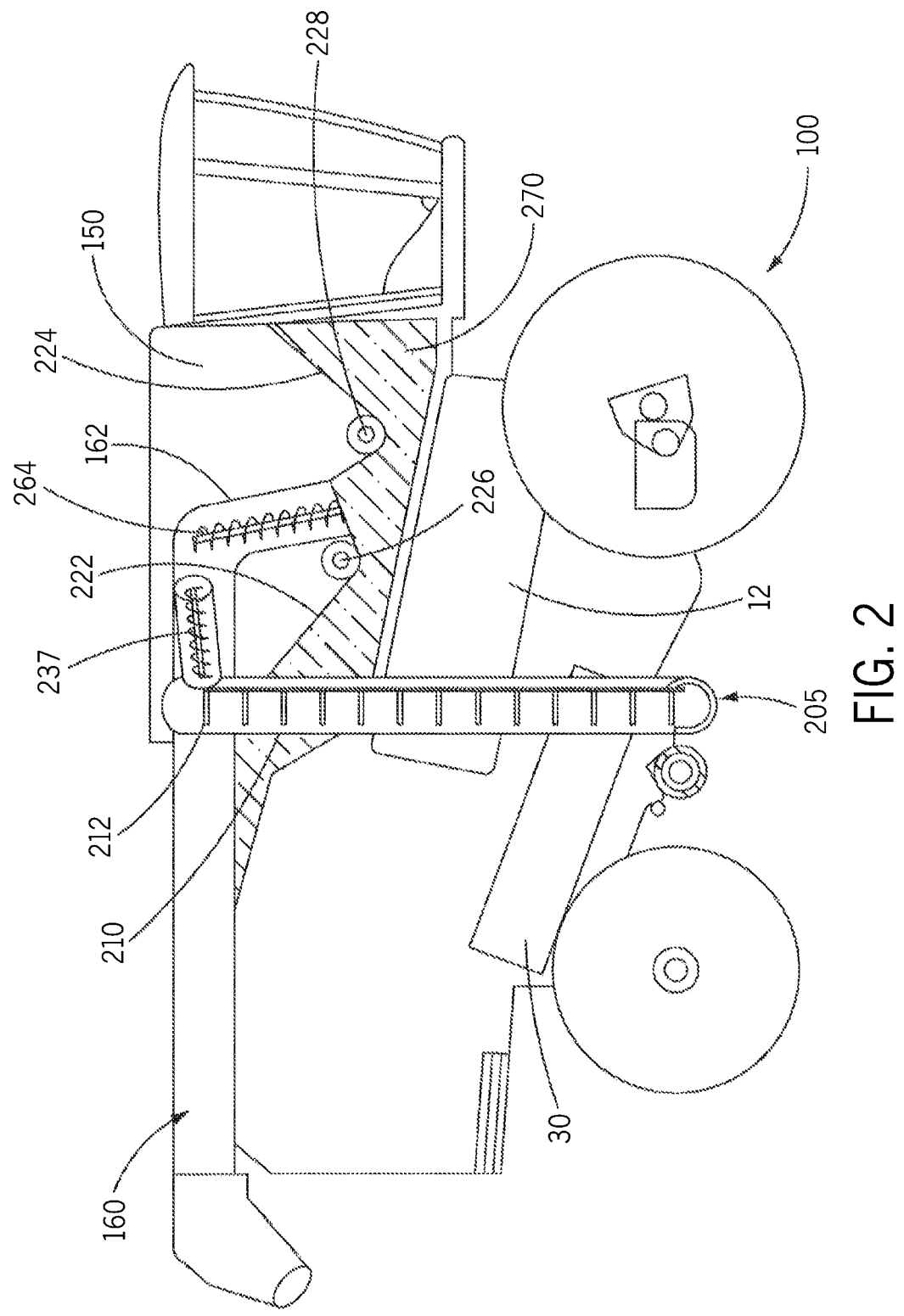
FIG. 2 is a side view of the combine of FIG. 1.

Referring now to the drawings, and more particularly to FIGS. 1 and 2, as is described in U.S. Pat. No. 9,961,835, which is incorporated by reference herein in its entirety, illustrated is an agricultural harvesting machine 100, such as a combine, for example, operable for harvesting a wide variety of grains, including, but not limited to, wheat, beans, corn, rice, and the like. The combine 100 includes a header 110, a longitudinally axially arranged threshing and separation system 12, and a concave 20 within the threshing and separation system 12. The threshing mechanism may also be of any known construction and operation.

As shown in FIG. 1, threshing and separation system 12 is axially arranged, in that it includes a cylindrical threshing rotor 14 supported and rotatable in a predetermined direction about a rotational axis therethrough for conveying a flow of crop material in a helical flow path through a threshing chamber 16 extending circumferentially around the rotor 14. Concave 20 may extend circumferentially around the rotor 14 and the flow of crop may pass in the space between the spinning rotor 14 and the concaves 20. As the crop material flows through the threshing and separation system 12, the crop material including, for example, grain, straw, legumes, and the like, will be loosened and separated from crop residue or MOG such as, for example, husks, cobs, pods, and the like, and the separated materials may be carried away from the threshing and separation system 12. Crop residue can be redistributed to the field via a spreader 120, located at, for example, the back of the harvester.

The remaining threshed crop, which includes the grain to be collected, is cleaned via a cleaning system 30 (shown in FIG. 2). The cleaning system 30 can include conventional winnowing mechanisms including a fan that blows air across a series of reciprocating sieves. Through the winnowing action of the air and the reciprocating sieves, clean grain may be collected and sorted from the remaining chaff. The cleaning system 30 separates out clean grain which collects along the path of the bottom of the cleaning system 30 at cross auger 205. The cross auger 205 moves the clean grain laterally to an elevator 210 which includes a paddle chain lift 212. The paddle chain lift 212, which includes paddles uniformly spaced along the chain to lift grain, conveys the grain upward to a dispenser auger 237 that discharges the grain into the grain tank 150. Other arrangements can implement different auger assemblies to either distribute the grain evenly along the bottom of the grain tank 150 or centrally in the middle of the grain tank 150.

At the bottom of grain tank 150, one or more grain tank augers, such as cross augers 226 and 228, for example, move grain laterally from the bottom of the grain tank 150 to a sump 330. Connected to sump 330 is a vertical tube 162 of unload tube 160 representing a turret style system of off-loading. Vertical tube 162 may include a single unload conveying auger 264 or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown.

In the arrangement of grain tank 150 illustrated in FIG. 2, side walls 222 and 224 are sloped such that as grain accumulates in the grain tank 150 as conveyed from dispenser auger 237, the grain naturally slides down to cross augers 226 and 228. Grain tank cross augers 226 and 228 convey the accumulated grain laterally so that it may be collected into sump 330 and then vertical tube 162 (FIG. 2) which includes an unload conveying vertical auger 264 that propels the grain upward.

As illustrated in FIGS. 3-5D, grain tank cross augers 226 and 228 are arranged along the transverse axis of the grain tank 150. Vertical auger 264 (shown in FIG. 4) is located within sump 330 of grain tank 150 for grain collection. The sump 330 is arranged either at a low or the lowest point of grain tank 150 for grain collection. The sump 330 is located adjacent the bottom end of the vertical auger 264 and provides an enclosed volume to hold grain. The sump 330 includes walls 310, 312, 314, 316, 318 surrounding auger 264. Those walls define an interior and partially enclosed space that is positioned to hold clean grain. Vertical tube/elbow 162 is mounted to top wall 318. The sump 330 has an interior portion for transferring grain from the cross-augers 226 and 228 to the vertical auger 264. The cross augers 226 and 228 may communicate with the interior of sump 330 and vertical auger 264 through cross auger inlet openings 432, 434 provided in one of the walls, e.g., interior facing side wall 310 of sump 330. The clean grain enters the grain tank 150 and the sump 330 by gravity, and the cross augers 226 and 228 convey the grain to the vertical auger 264 through corresponding cross auger inlet openings 432, 434 (FIG. 4) in the sump 330.

Figure 3:
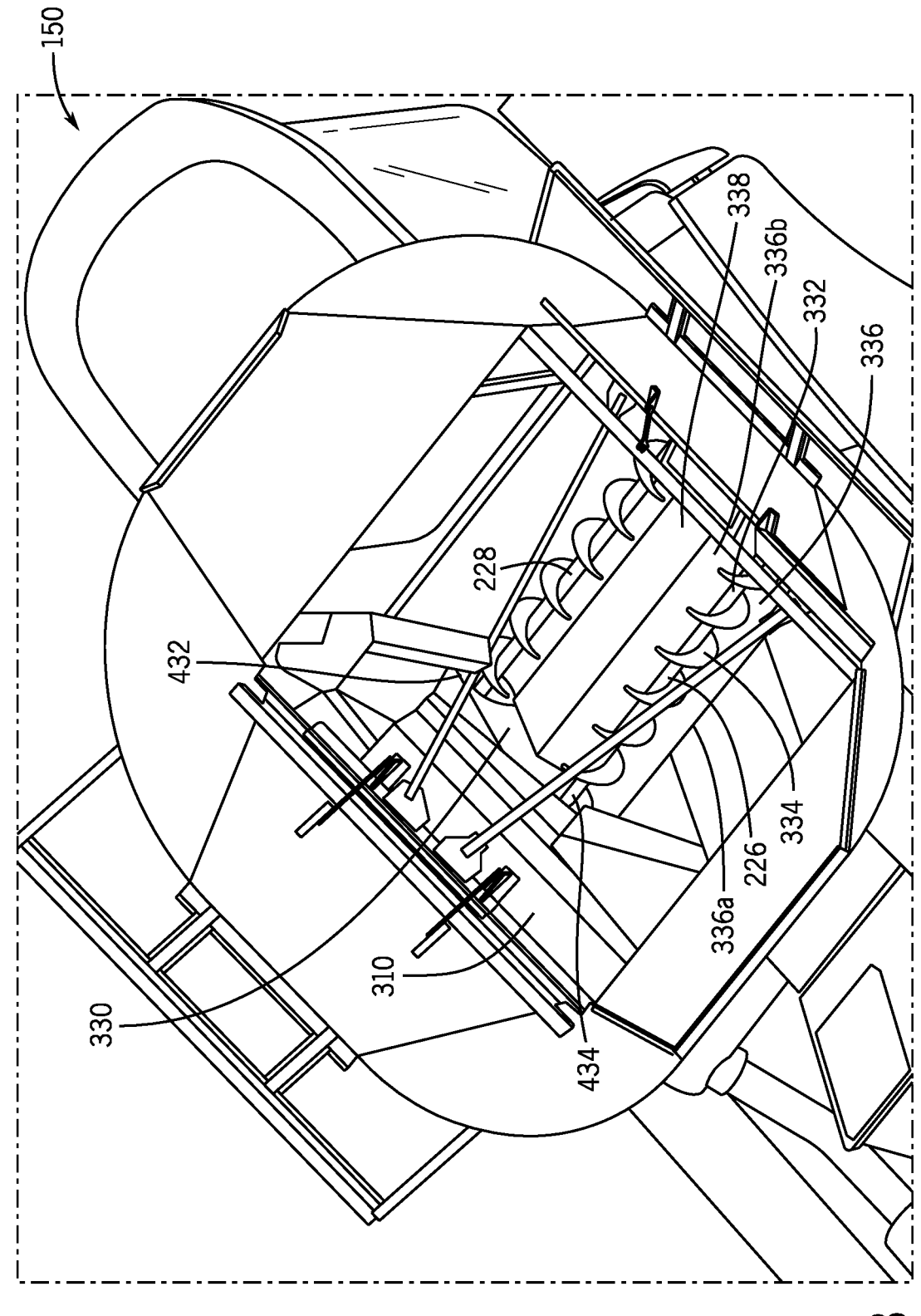
FIG. 3 is a top view of a grain tank of the combine of FIGS. 1 and 2.
Figure 4:
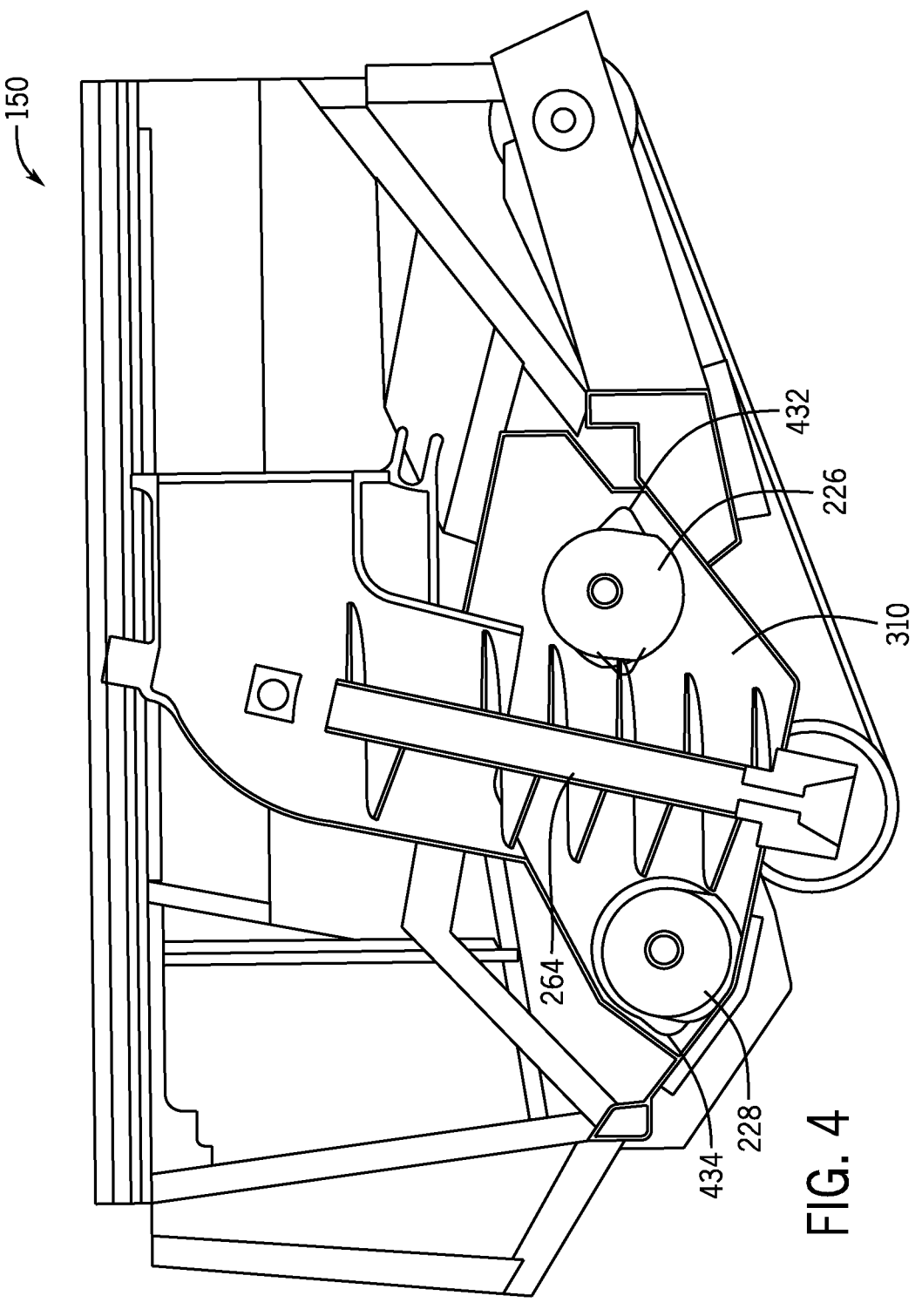
FIG. 4 is a cross-section view of the combine grain tank of FIG. 3 with a grain tank sump and a vertical auger within the sump, as viewed from inside the sump, according to one embodiment.

Turning back to FIG. 3, each of the cross augers 226 and 228 can be arranged in an elongated trough 336 and 338, respectively. The elongated troughs 336 and 338 include slopped walls 336a, 336b (only walls 336a, 336b of trough 336 is shown in FIG. 3 for clarity) such that as grain accumulates in the troughs 336 and 338, the grain naturally slides down toward the vertical auger 264. The elongated troughs 336 and 338 are open-topped troughs that are connected together to (optionally) form a continuous top surface along which grain can reside and move. The cross augers 226 and 228 are preferably elongated spiral screw augers. Each of the cross augers 226 and 228 includes an axle or shaft 332 about which a helical blade 334, also called an auger flighting, is disposed. As the cross augers 226 and 228 are rotated, the blades 334 move the grain in a transverse direction toward the inlets of sump 330. Cross-augers 226 and 228 are at least partially positioned through the sump inlets to extend through the sump wall 310 and within the interior of the sump 330.

The size and shape of the cross auger inlet openings 432, 434 may vary. Described hereinafter are different variants of the cross auger inlet openings 432, 434.

Figure 8:
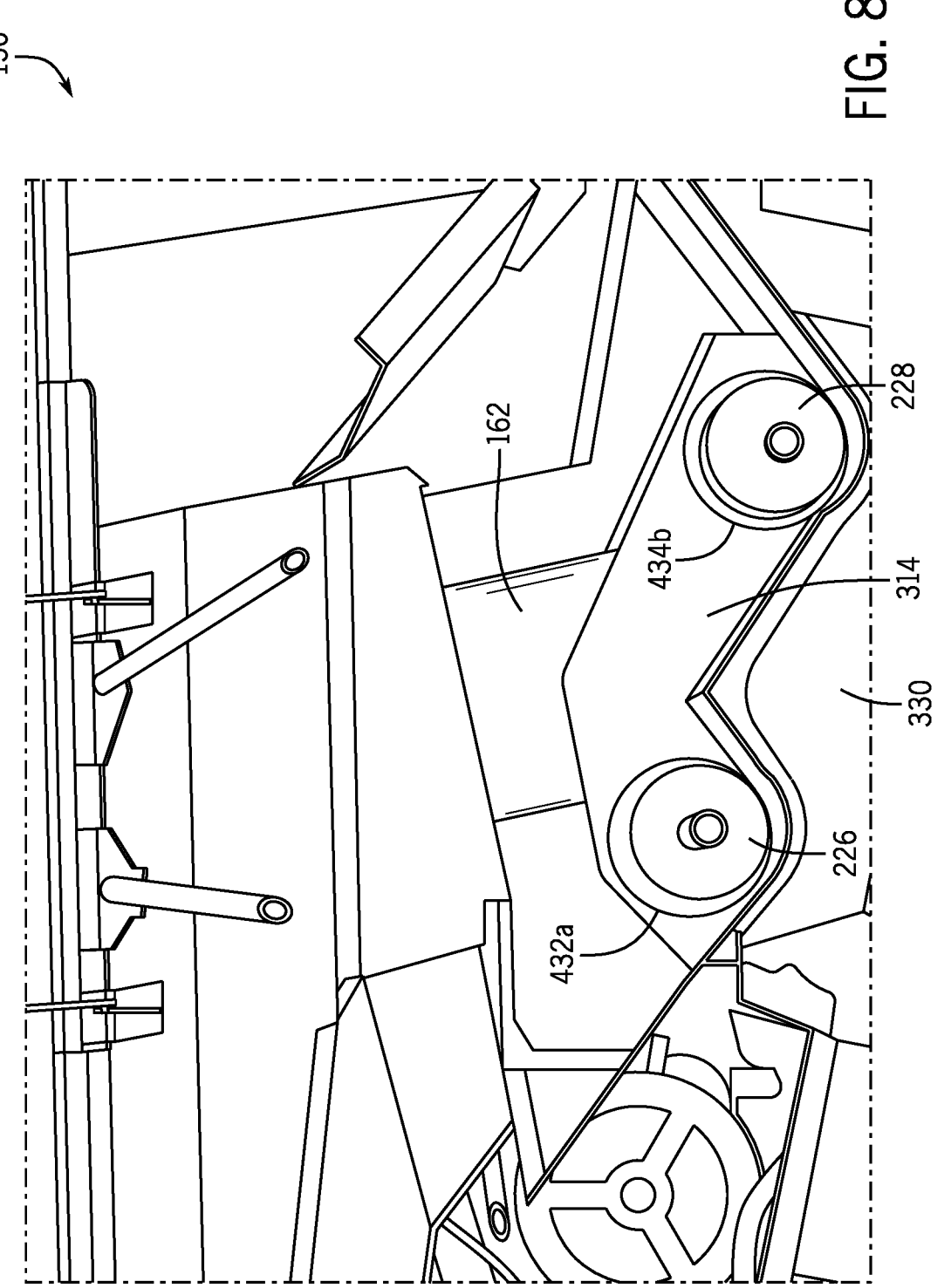
FIG. 8 is a cross-sectional view of a combine grain tank like the one shown in FIG. 3, with the exception that the sump of the grain tank has circular sump inlet openings, as viewed from outside of the sump, according to another embodiment.

As illustrated in FIG. 8, inlet openings 432A, 434A in the sump 330 can have a round or circular shape. It has been found, however, that the circular shape of the cross-auger inlet openings 432A, 434A shown in FIG. 8 offers minimal space for the grain to move freely along the length of the cross augers 226 and 228 and be delivered efficiently to the vertical auger 264. This arrangement requires relatively more power to move the grain during unload. A related configuration is described in U.S. Pat. No. 9,877,431, which is incorporated by reference herein in its entirety.

Figure 6:
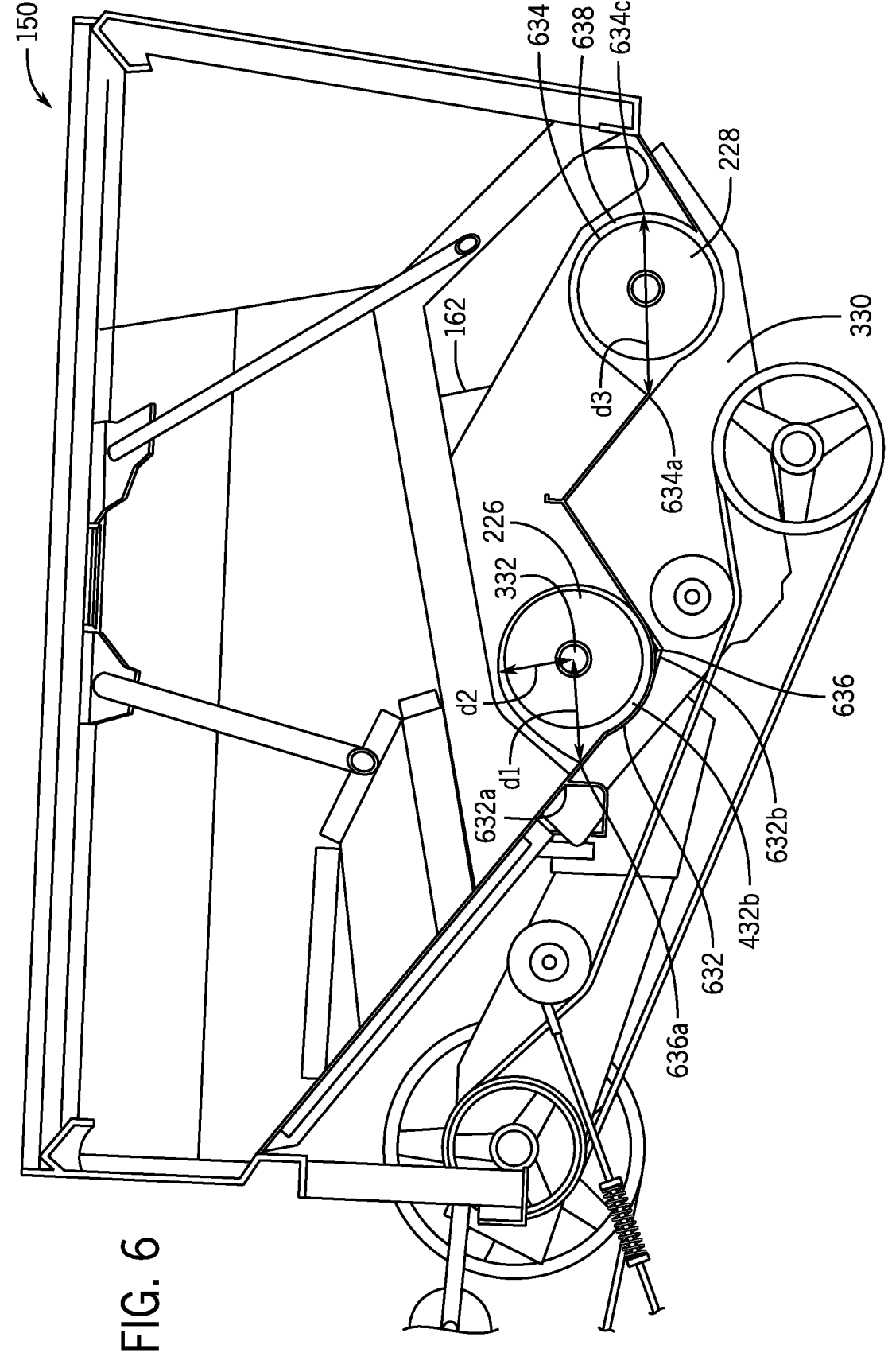
FIG. 6 is a cross-sectional view of the combine grain tank of FIGS. 3 and 4, as viewed from outside of the sump.
Figure 7:
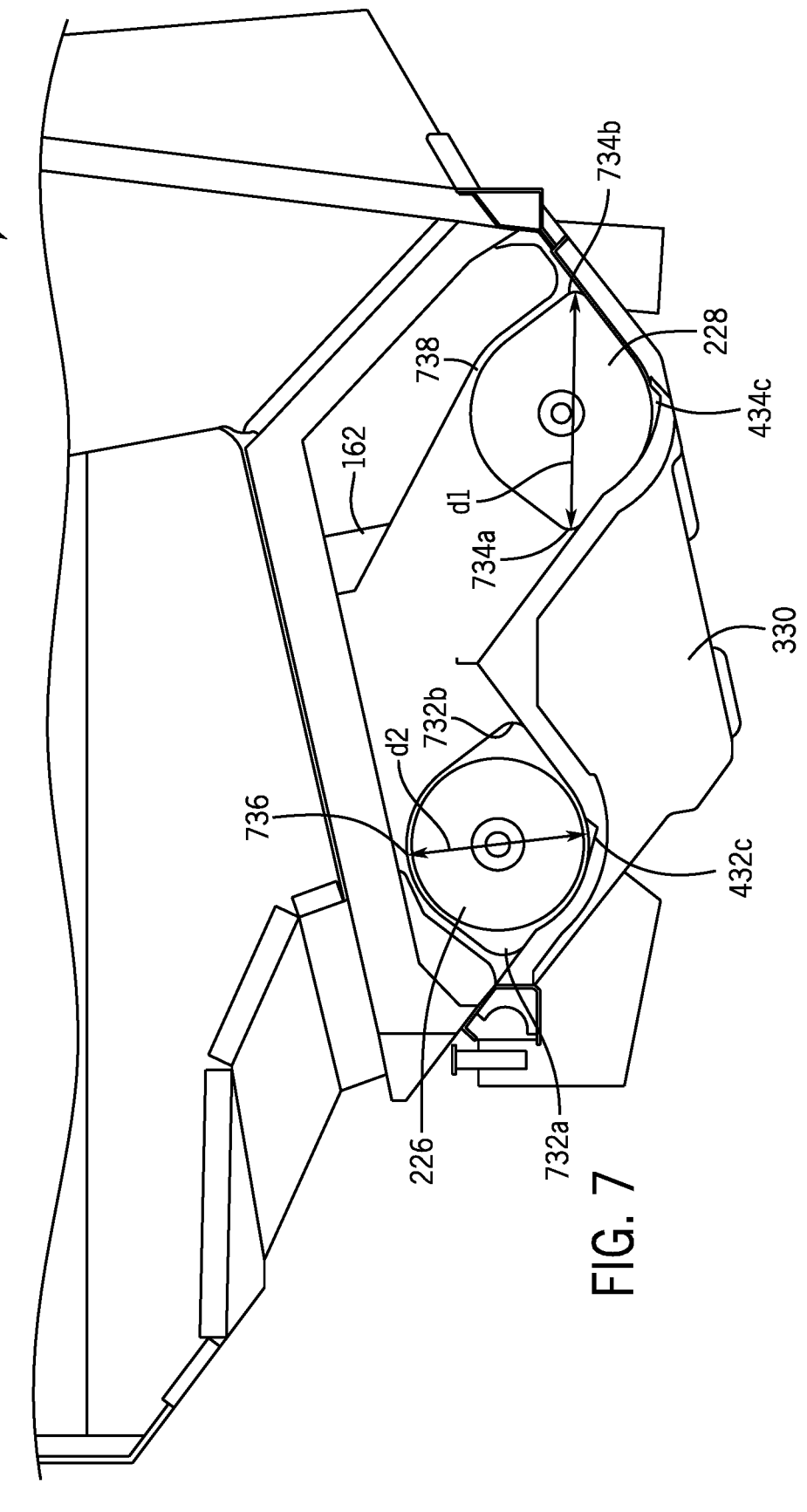
FIG. 7 is a cross-section view of a combine grain tank like the one shown in FIG. 3 with the exception that the sump of the grain tank has eye-shaped sump inlets, as viewed from outside of the sump, according to still another embodiment.

The embodiments of the grain tanks illustrated in FIG. 6 and FIG. 7 include cross auger grain inlet openings 432B, 434B and 432C, 434C, respectively, with shapes approximating the shape of a tear drop (FIG. 6) and an eye (FIG. 7), respectively. Other shapes, such as oval or almond, for example, are also possible. Each of the inlet openings 432B, 434B and 432C, 434C is non-circular. These configurations maximize the flow of grain along the length of the cross augers 226 and 228 and into the interior of the sump 330, which significantly decreases the power requirements to move the grain during unload.

Figure 5A:
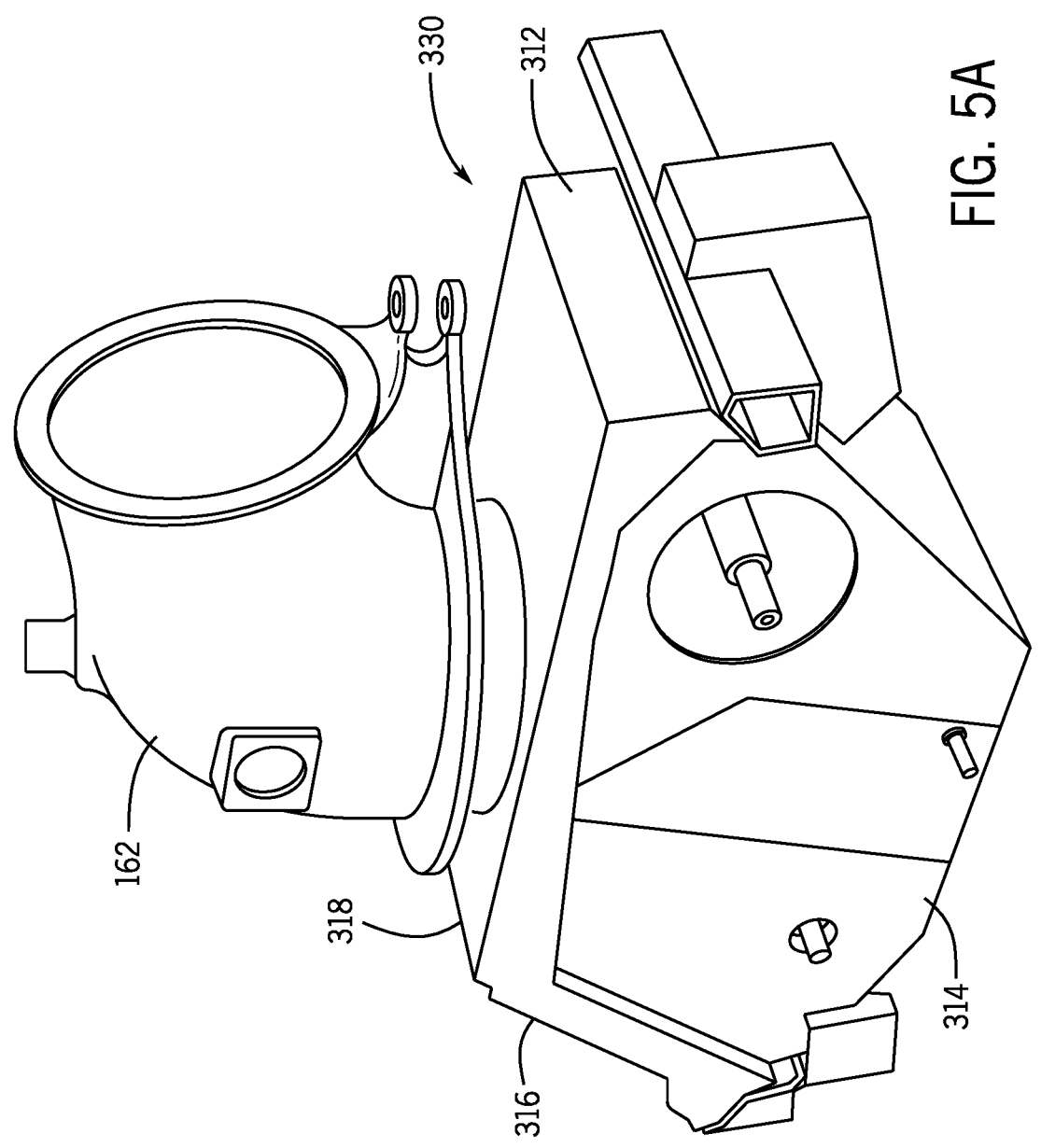
FIG. 5A is a side perspective view of the grain tank sump of the combine grain tank of FIG. 3, according to one embodiment.
Figure 5B:
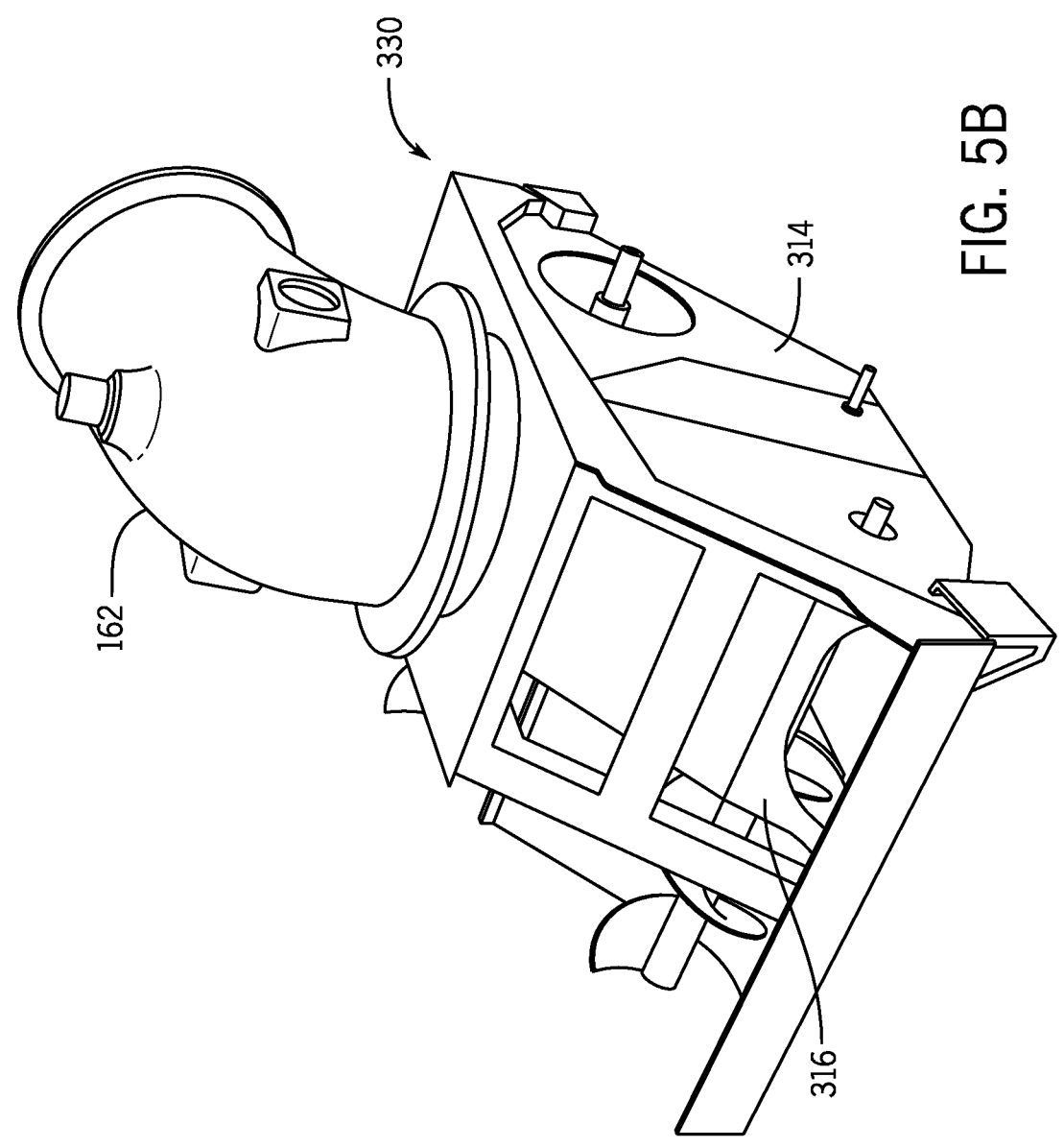
FIG. 5B is a rear perspective view of the grain tank sump of FIG. 5A, according to one embodiment, whereby the grain tank sump has teardrop shaped inlet openings.
Figure 5C:
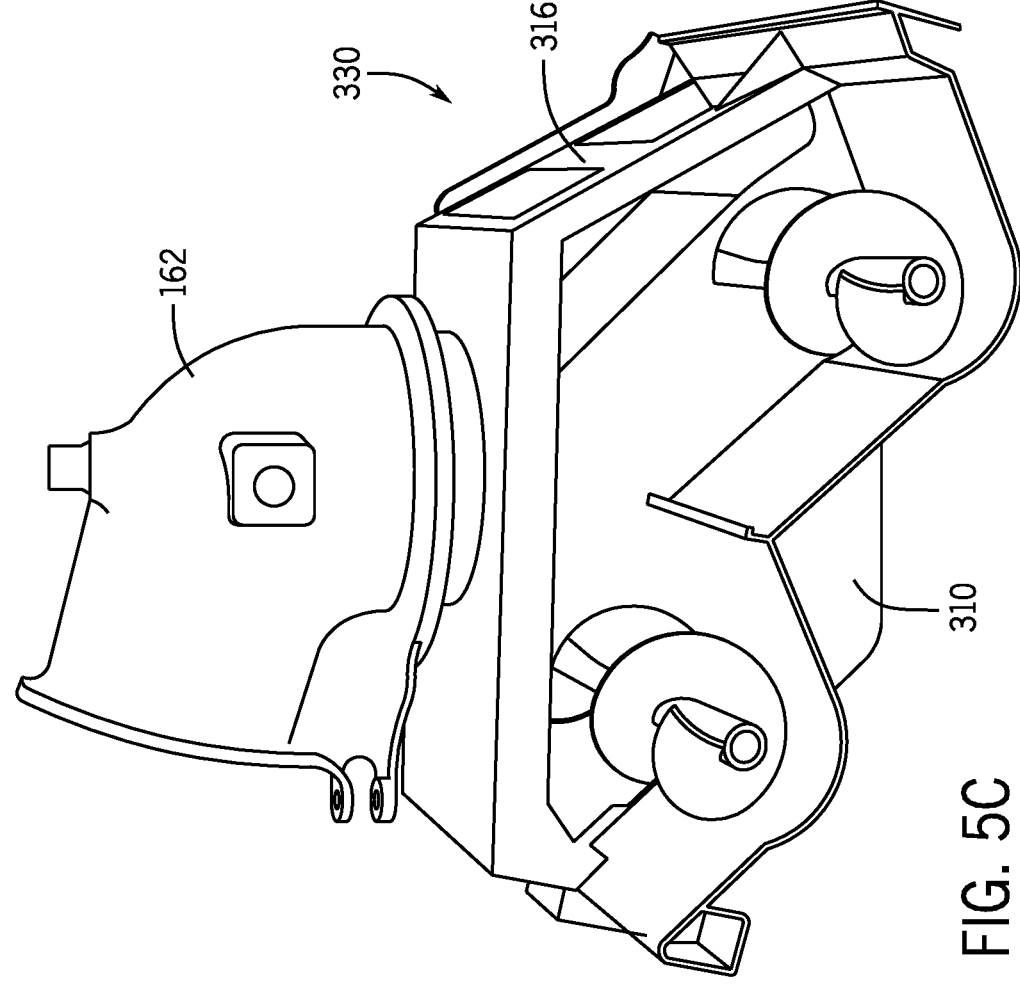
FIG. 5C is another side perspective view of the grain tank sump of FIG. 5A, showing the opposite side wall and cross augers (shown cutaway), according to one embodiment.
Figure 5D:
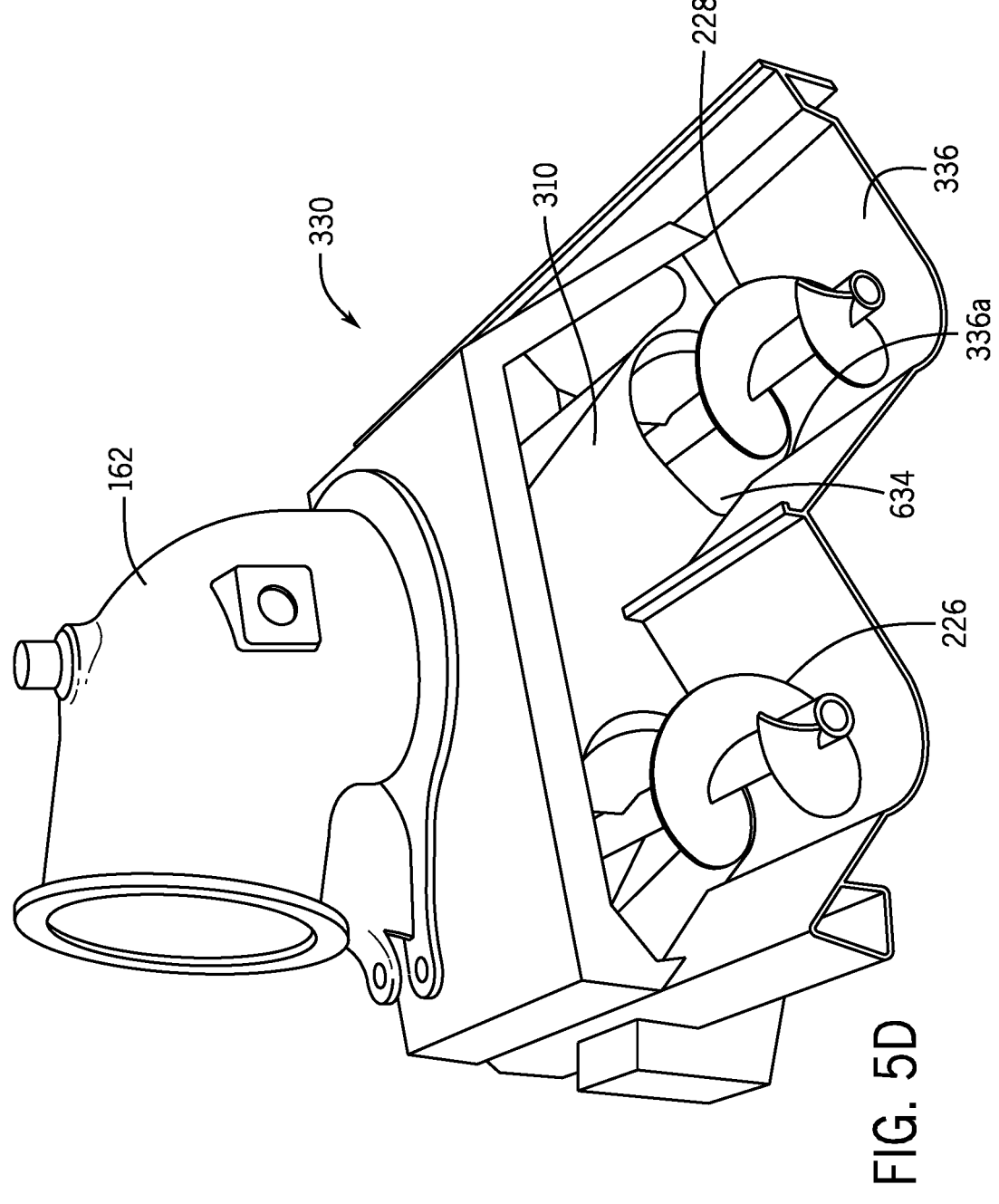
FIG. 5D is another side perspective view of the grain tank sump of FIG. 5C, showing the opposite side wall and cross augers, according to one embodiment.

In the embodiment of the grain tank 150 illustrated in FIG. 6, the cross auger grain inlet openings 432B, 434B have a tear drop shape. In particular, each of the cross auger grain inlet openings 432B, 434B, respectively, includes one straight (or linear) segment (or edge) 632, 634, respectively, and a rounded segment (or edge) 636, 638, respectively. Each of the cross-auger inlet openings 432B, 434B tapers from the rounded segment 636, 638, respectively, toward the straight segment 632, 634, respectively, in the longitudinal direction of the agricultural harvester. As best illustrated in FIG. 5D, for example, the straight (or linear) segments 632, 634 follow the trajectory of one of the walls, e.g., wall 336a of the trough 336. Although only straight segment 632 and wall 336a are shown in FIG. 5D for clarity, both straight segment 632 and 634 follow the trajectory of one of the walls of the troughs 336, 338. The straight (or linear) segment 632, 634 provides additional spaces in one side of each of the cross auger grain inlet openings 432B, 434B relative to the axle 332 of the cross augers 226 and 228. These additional spaces allow increased flow of grain along the cross augers 226 and 228 toward the vertical auger 264. As illustrated in FIG. 6, the distance d1 from each of the far-end portions 632a, 634a of the straight segments 632, 634, respectively, of the cross auger grain inlet openings 432B, 434B to the shaft 332 in the longitudinal direction of the combine 100 (only the distance d1 from the far-end portion 632a to the shaft 332 is shown in FIG. 6 for clarity) is larger than the distance d2 from the far-end portions 636a, 636b and 634a, 634b of the rounded segment (or edge) 636, 638, respectively, of the cross auger grain inlet openings 432B, 434B to the shaft 332 in the vertical direction of the combine 100. The distance d3 between each of the far-end portions 632a, 634a of the straight segments 632, 634, respectively, of the cross auger grain inlet openings 432B, 434B and the far-end portions 636c, 634c of the rounded segment (or edge) 636, 638, respectively, in the longitudinal direction of the combine 100 is larger than the diameter of the rounded segment (or edge) 636, 638, respectively, of the cross auger grain inlet openings 432B, 434B. The distance d1 from each of the far-end portions of the straight segments 632, 634, respectively, of the cross auger grain inlet openings 432B, 434B to the shaft 332 in the longitudinal direction of the combine 100 is larger than the radius of the rounded segment (or edge) 636, 638, respectively, of the cross auger grain inlet openings 432B, 434B. Experimental results demonstrate that the tear drop shape of the cross auger grain inlet openings 432B, 434B results in a reduction of the overall energy required to move the grain through the grain tank, which includes the power consumed by the cross augers 226, 228 and the vertical auger 264.

In the embodiment of the grain tank 150 illustrated in FIG. 7, the cross auger grain inlet openings 432C, 434C have an eye or almond shape. In particular, each of the cross auger grain inlet openings 432C, 434C, respectively, includes two straight (or linear) segments (or edges) 732a, 732b and 734a, 734b, respectively, and a rounded edge or segment 736, 738, respectively. Each of the two straight (or linear) segments 732a, 732b and 734a, 734b, respectively, is arranged on an opposite side of the cross-auger inlet openings 432C, 434C, respectively, relative to the axle 332 of the cross-auger inlet openings 432C, 434C, respectively, in the longitudinal direction of the agricultural harvester. Each of the rounded segments 736, 738 of the cross-auger inlet openings 432C, 434C, respectively, tapers in the opposite direction relative to the other one of the rounded segments 736, 738, toward the straight segments 732a, 732b and 734a, 734b, respectively, in the longitudinal direction of the agricultural harvester. The straight (or linear) segments 732a, 732b and 734a, 734b, respectively, follow the trajectory of a corresponding one of the walls 336a, 336b of the troughs 336, 338, similar to the configuration illustrated in FIG. 5D, for example. A first distance d1 between the far-end portions of the two straight segments 732a, 732b and 734a, 734b, respectively, of the cross-auger inlet openings 432C, 434C, respectively, in the longitudinal direction of the agricultural harvester (only the distance d1 for the cross-auger inlet opening 434C is shown in FIG. 7 for clarity) is larger than a second distance d2 between the far-end portions of the rounded segments 736, 738, respectively of the cross-auger inlet openings 432C, 434C, respectively, in the vertical direction of the agricultural harvester. The first distance d1 between the two straight segments 732a, 732b and 734a, 734b, respectively, of the cross-auger inlet openings 432C, 434C, respectively, in the longitudinal direction of the agricultural harvester is larger than the diameter of the rounded segments 736, 738, respectively of the cross-auger inlet openings 432C, 434C, respectively. The two straight (or linear) segments 732a, 732b provide two additional spaces on both sides of each of the cross auger grain inlet openings 432, 434 relative to the axle 332 of the cross augers 226 and 228. As compared with perfectly circular inlet openings such as shown in FIG. 8, these additional spaces in the inlet openings 432C, 434C further increase the available space to accommodate the flow of grain along the cross augers 226 and 228 and into the sump 330. As illustrated in FIG. 7, the distance d1 of the cross auger grain inlet openings 432C, 434C in the longitudinal direction of the combine 100 is larger than the distance d2 of the cross auger grain inlet openings 432C, 434C in the vertical direction of the combine 100. Experimental results demonstrate that the eye shape of the cross auger grain inlet openings 432C, 434C results in a reduction of the overall energy required to move the grain through the grain tank, which includes the power consumed by the cross augers 226, 228 and the vertical auger 264, which translates into substantial savings of power necessary to expel grain from the grain tank.

Compared to the embodiment illustrated in FIG. 6, the distance d1 in FIG. 7 is larger than the distance d3 in FIG. 6. The larger distance d1 in FIG. 7 results in extra space compared to the embodiment shown in FIG. 6, which further increases the flow of grain along the cross augers 226 and 228 toward the vertical auger 264 (FIG. 4) and may result in a further reduction of the overall energy necessary to expel grain from the grain tank.

Changing the shape of the cross auger grain inlet openings 432A, 434A from round shape (FIG. 8) to the tear drop shape of FIG. 6 or the eye shape of FIG. 7 provides additional space(s) for the grain to move freely and be delivered efficiently into the sump 330. In particular, both the tear drop shape (FIG. 6) and the eye shape (FIG. 7) increase the inlet space, which increases the amount of grain that can be fed to the vertical auger 264, which increases the overall efficiency of the grain unloading system. As a result, the overall energy consumption of the grain tank unload system is substantially reduced.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A clean grain tank assembly of an agricultural harvester, comprising:
   a grain tank with a sump;
   a vertical auger having an end positioned within the sump of the grain tank that removes clean grain from the sump; and
   at least one cross-auger arranged in a trough of the grain tank that conveys the grain into the sump,
   wherein the sump is partially encompassed by walls, one of the walls including a cross-auger inlet opening facing the cross-auger through which the grain passes into the sump, the cross-auger inlet opening has a rounded segment and at least one straight segment, wherein the at least one straight segment follows a trajectory of a wall of the trough.

2. The clean grain tank assembly of claim 1, wherein the cross-auger inlet opening is non-circular.

3. The clean grain tank assembly of claim 1, wherein a first distance of the cross-auger inlet opening in a longitudinal direction of the agricultural harvester is larger than a second distance of the cross-auger inlet opening in a vertical direction of the agricultural harvester.

4. The clean grain tank assembly of claim 1, wherein the cross-auger inlet opening includes two straight segments, each of the two straight segments arranged on an opposite side of the cross-auger inlet opening relative to an axle of the cross-auger inlet opening in a longitudinal direction of the agricultural harvester.

5. The clean grain tank assembly of claim 4, wherein a first distance between the two straight segments of the cross-auger inlet opening, as measured in the longitudinal direction of the agricultural harvester, is larger than a second distance between end portions of the rounded segment of the cross-auger inlet opening, as measured in a vertical direction of the agricultural harvester.

6. The clean grain tank assembly of claim 1, wherein the at least one cross-auger comprises a shaft,
   wherein a first distance measured between the shaft and the at least one straight segment of the cross-auger inlet opening is larger than a second distance measured between the shaft and the rounded segment of the cross-auger inlet opening.

7. The clean grain tank assembly of claim 1, wherein the cross-auger inlet opening tapers from the rounded segment toward the at least one straight segment in the longitudinal direction of the agricultural harvester.

8. The clean grain tank assembly of claim 1, wherein the cross-auger inlet opening includes two straight segments and the rounded segment of the cross-auger inlet opening tapers in two opposite directions toward the two straight segments in the longitudinal direction of the agricultural harvester.

9. The clean grain tank assembly of claim 8, wherein the at least one cross-auger comprises a shaft, and
   wherein a first distance from a corresponding far-end portion of each of the two straight segments of the cross-auger inlet opening relative to the shaft is larger than a diameter of the rounded segment of the cross-auger inlet opening.

10. The clean grain tank assembly of claim 1, wherein the at least one cross-auger comprises a shaft, and
    wherein a first distance measured between the shaft and a first far-end portion of the at least one straight segment of the cross-auger inlet opening is larger than a second distance measured between the shaft and a second far-end portion of the rounded segment of the cross-auger inlet opening.

11. The clean grain tank assembly of claim 1, wherein the at least one cross-auger comprises a shaft, and
    wherein a first distance between the shaft and a far-end portion of the at least one straight segment of the cross-auger inlet opening is larger than a radius of the rounded segment of the cross-auger inlet opening.

12. The clean grain tank assembly of claim 1, wherein the cross-auger inlet opening includes two straight segments, and
    wherein a first distance between far-end portions of the two straight segments is larger than a diameter of the rounded segment of the cross-auger inlet opening.

13. The clean grain tank assembly of claim 1, wherein the sump is located at a bottom of the vertical auger, and
    wherein the sump provides an enclosed volume to hold the grain.

14. The clean grain tank assembly of claim 1, wherein the cross-auger inlet opening is oval, tear shaped, or almond shaped.

15. An agricultural harvester comprising the clean grain tank assembly of claim 1.

16. The clean grain tank assembly of claim 1, wherein the at least one straight segment is aligned with the wall of the trough.

17. The clean grain tank assembly of claim 16, wherein the rounded segment is aligned with the wall of the trough.

18. The clean grain tank assembly of claim 17, wherein the wall of the trough extends directly from the rounded segment and the at least one straight segment.

19. The clean grain tank assembly of claim 16, wherein the at least one straight segment and the wall that is aligned with the at least one straight segment are arranged at a same angle.

* * * * *